United States Patent
Pan et al.

(10) Patent No.: US 11,775,336 B2
(45) Date of Patent: Oct. 3, 2023

(54) APPARATUS AND METHOD FOR PERFORMANCE STATE MATCHING BETWEEN SOURCE AND TARGET PROCESSORS BASED ON INTERPROCESSOR INTERRUPTS

(71) Applicant: Intel Corporation, Santa Clara, CA (US)

(72) Inventors: Jacob Pan, Portland, OR (US); Ashok Raj, Portland, OR (US); Srinivas Pandruvada, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 16/723,691

(22) Filed: Dec. 20, 2019

(65) Prior Publication Data

US 2021/0191753 A1    Jun. 24, 2021

(51) Int. Cl.
*G06F 9/48* (2006.01)
*G06F 9/54* (2006.01)
*G06F 15/163* (2006.01)
*G06F 15/173* (2006.01)

(52) U.S. Cl.
CPC ............ *G06F 9/4812* (2013.01); *G06F 9/544* (2013.01); *G06F 15/163* (2013.01); *G06F 15/17325* (2013.01); *G06F 2209/486* (2013.01)

(58) Field of Classification Search
CPC ...... G06F 9/4812; G06F 9/544; G06F 15/163; G06F 15/17325; G06F 2209/486
See application file for complete search history.

(56) References Cited

U.S. PATENT DOCUMENTS

| | | | |
|---|---|---|---|
| 7,174,467 B1 * | 2/2007 | Helms | G06F 9/30083 |
| | | | 713/323 |
| 2014/0365808 A1 * | 12/2014 | Deshmukh | G06F 1/12 |
| | | | 713/375 |
| 2017/0168872 A1 * | 6/2017 | Kim | G06F 9/4887 |

* cited by examiner

*Primary Examiner* — Jaweed A Abbaszadeh
*Assistant Examiner* — Hyun Soo Kim
(74) *Attorney, Agent, or Firm* — NICHOLSON DE VOS WEBSTER & ELLIOTT LLP

(57) ABSTRACT

Apparatus, method, and machine-readable medium to provide performance state matching between source and target processors based on inter-processor interrupts. An exemplary apparatus includes a target processor to execute a receiving task at a first performance level and a source processor to execute a sending task at a second performance level higher than the first performance level. The sending task is to store interrupt routing data indicating a pairing between the sending task and the receiving task into a memory location and that the sending task is to dispatch work to be processed by the receiving task. The apparatus further includes a performance management unit to detect the pairing between the sending task and the receiving task based on the interrupt routing data and responsively adjust the performance level of the target processor from the first performance level to the second performance level based, at least in part, on the pairing.

20 Claims, 12 Drawing Sheets ns in a source instruction set to binary instructions in a
APPARATUS AND METHOD FOR PERFORMANCE STATE MATCHING BETWEEN SOURCE AND TARGET PROCESSORS BASED ON INTERPROCESSOR INTERRUPTS

TECHNICAL FIELD

Embodiments of the invention described herein relate generally to the performance management in a computer processing system. In particular, the disclosure relates to managing processor performance based on inter-process communication.

BACKGROUND ART

In today's power-constrained computing environment, achieving low latency performance is a relentless goal which requires sophisticated and often awkward coordination among hardware, power management/control unit(s), and operating system (OS) software. However, despite their best efforts, inefficiencies still exist. For example, in the case of inter-processor communication (IPC), coordination between the afore-mentioned components tend to be difficult and time-consuming because the OS-provided IPC is often disconnected from CPU interrupt affinity and performance state management. In a typical producer-consumer use case where a producer (e.g., process, task, or thread) running on a source processor generates work for a corresponding consumer (e.g. process, task, or thread) running on target processor, it usually takes some time for the target processor to ramp up its performance level to match that of the source processor. This results in performance latency between the producer and the consumer because the consumer cannot process work at the speed of the producer during the ramp up period.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
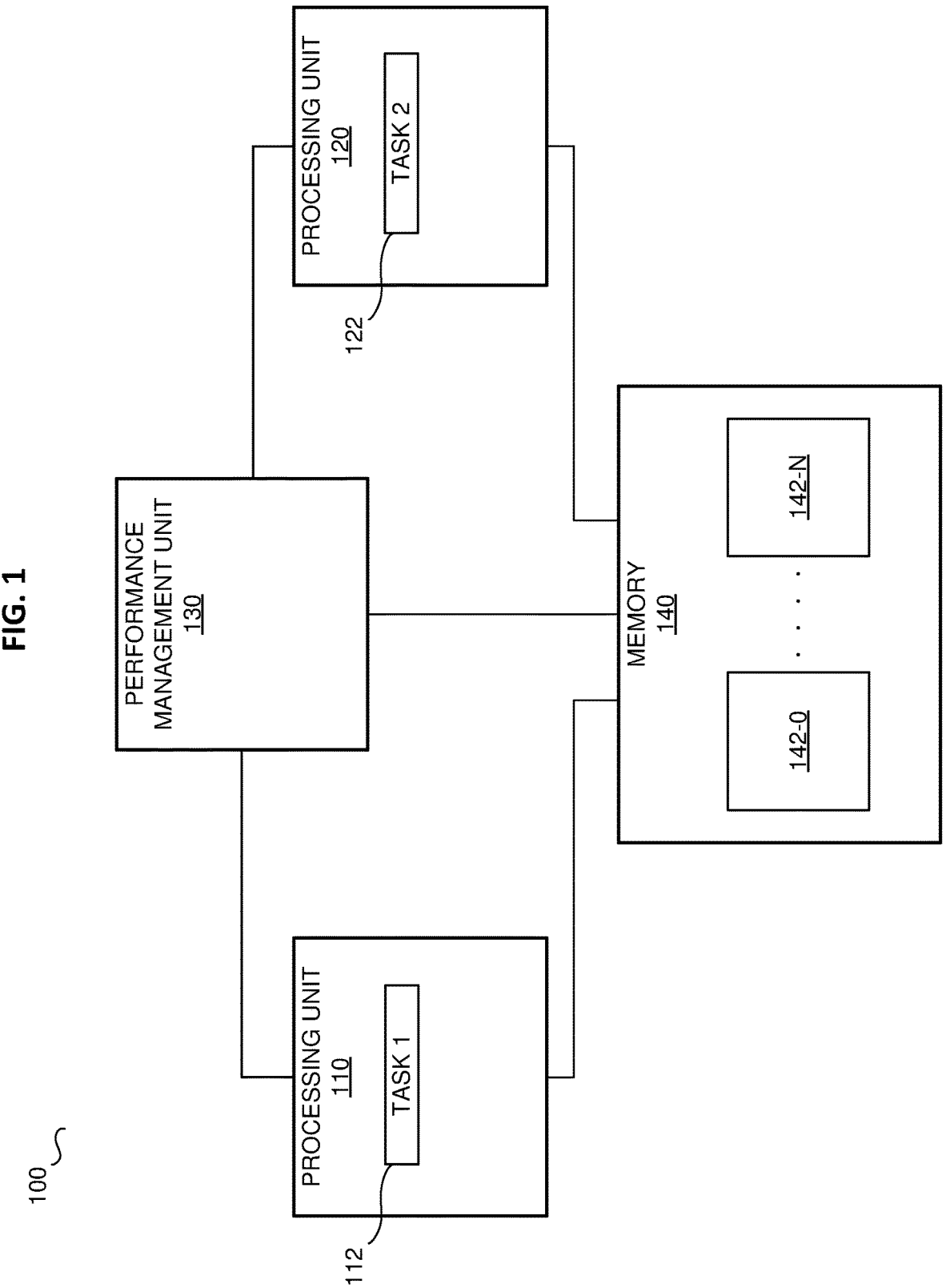
FIG. 1 is a block diagram illustrating a system embodiment on which performance state matching of source and target processors may be implemented.

Embodiments of apparatus and method for implementing a mechanism to match performance states between producer and consumer processors based on inter-process communication are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Inter-process communication (IPC), as the name suggests, is a mechanism that allows processes to communicate with one another and to synchronize their actions. A process may be a task or a thread. For simplicity, the term "task" will be used throughout this disclosure. IPC messages are typically bound by the sending task and receiving task with some handle, such as file descriptors. Typically, the sending task and the receiving task are scheduled at runtime, which means that they may be executed by any processor that happens to have capacity at that time. Since the scheduler and the load balancer do not have knowledge of the IPC sender-receiver (or producer-consumer) relationship among the tasks, the identity and the performance state of the target processor on which the receiving task is executed are unknown to the scheduler and load balancer at the time when IPC is initiated. As such, the performance state of the target processor cannot not be adjusted (e.g., boosted) quickly to minimize the latency attributed to the target processor initially operating a lower performance levels than that of the source processor. Moreover, since the IPC message is typically buffered in the OS kernel, it can sometimes take a very long time for the OS to react to the send interrupt event, even though the sending task is already in the running state and ready to generate and dispatch work for the receiving task.

Aspects of the present invention relate to user inter-processor interrupt (UIPI) connections and extensions for providing routing data or routing information, which are aligned with task and processor affinity, to the performance management unit(s). By monitoring the routing information between tasks, the performance management unit(s) can more accurately anticipate, and thereby better prepare, for the need to increase performance in the target processors. In one aspect, the performance management unit receives an advanced out-of-band communication of an impending interrupt message to a target processor. This, in turn, allows the performance management unit to timely boost the performance state of the target processor for low latency processing of the interrupt message and any work associated therewith.

Consider a scenario where task A runs on processor A and task B runs on processor B. To send UIPI from task A to task B, user calls kernel API to set up interrupt routing in each task's task structure (system memory descriptor table). The routing may consist of setting up and/or modifying one or more task structures associated with the sender (i.e. task A) and/or the receiver (i.e. task B), and the task structure entries. At the time the interrupt routing is populated, any relevant performance management unit is also notified with the routing information, such as specific address of the UIPI target entry and/or user interrupt posting information (APIC ID, etc.). The performance management unit, in turn, records the routing information and uses it to perform performance state pairing or matching between the source and target processors. If one of the tasks migrates, or is moved, to another processor, the performance management unit is notified of the change and may responsively update its records and make the necessary performance level adjustments based on the new information. As a result, this mechanism ensures that when the sender task A is busy processing data and dispatch work to task B for latency processing, both task A and task B are running in a high-performance state.

FIG. 1 is a block diagram illustrating a system embodiment on which various aspects of the present invention may be implemented. System 100 may include a plurality of processing units, including a first processing unit 110 and a second processing unit 120 on which respective tasks 112 and 122 are executed. While only two processing unit are illustrated, system 100 may include any additional number of processing units. A processing unit may be a processor, processor core, central processing unit (CPU), graphics processing unit (GPU), accelerated processing unit (APU) that integrates CPU and GPU functionality in a single chip, etc.

Also included in system 100 is a memory 140 for storing instructions and data to be accessed by processing units 110 and 120. While represented as a single block, memory 140 may include, or be distributed over, one or more physical memory modules. Stored within memory 140 is a plurality of task structures 142. Each of the processing units (e.g., 110 and 120) may be associated with one or more task structures 142. For example, each of the processing units 110, 120 may be associated with a respective sending task structure for storing information relating to the interrupt (e.g., routing information) to be send by that processing unit. Moreover, each of the processing units 110, 120 may also be associated with a respective receiving task structure for storing interrupt information received from other tasks. The interrupt information may include interrupt posting descriptors, source/destination CPU identifier, etc. To prevent unauthorized access from users and software applications, task structures 142 may be stored within the kernel space of memory 140.

Still referring to FIG. 1, system 100 may further include one or more performance management units (PMUs) 130 for controlling the performance of the processing units within system 100. The PMU may be implemented as hardware circuitry, software, or a combination of both. A variety of techniques and methods may be utilized by the PMU 130 for controlling the performance of the processing units. For example, the PMU 130 may alter the performance of a processing unit by adjusting the power supplied to that processing unit. An increase in supplied power (e.g., voltage) may raise the performance level of the processing unit while a decrease in supplied power may lower it. In this regard, the PMU may sometimes also be referred to as power-control unit or power-management unit. In other embodiments, the performance of the processing units may be controlled by the PMU explicitly setting the operating frequency and/or the operating clock cycle of the processing units. Other functions of the PMU 130 may include the monitoring and the reporting of the performance level of the processing units. While only one PMU 130 is illustrated in FIG. 1, system 100 may include any number of PMUs. For example, each of the processing units 110 and 120 may be associated with a respective PMU for controlling that processing unit's performance.

Figure 2:
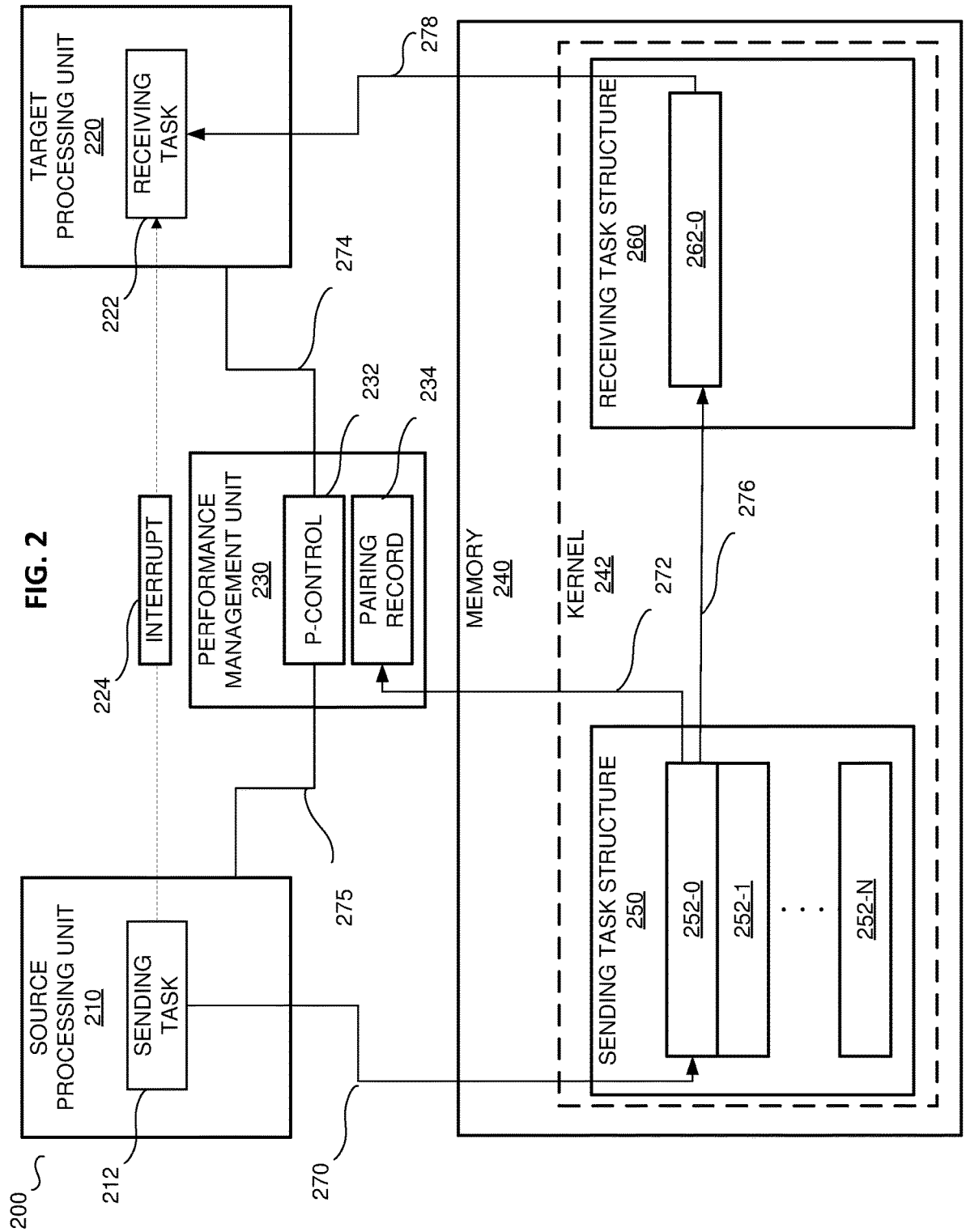
FIG. 2 is a block diagram illustrating the underlying interactions of an UIPI exchange in accordance to an embodiment.

FIG. 2 illustrate the underlying interactions of an UIPI exchange in accordance to an embodiment. System 200 includes processing units 210 and 220, which may be same or similar to processing units 110 and 120 of FIG. 1. While only two processing units are illustrated, system 2 may include any number of additional processing units. Processing unit 210 executes task 212 and processing unit 220 executes task 222. The execution of task 212 on processing unit 210 may generate work for task 222 on processing unit 220. As such, task 212 may be referred to as the producer or the sending task while task 222 may be referred to as the consumer or receiving task. Similarly, the processing unit on which the sending task 212 is executed may be referred to as the source processing unit 210 and the processing unit on which the receiving task 222 is executed may be referred to as the target processing unit 220. In some embodiments, data may be generated during the execution of task 212 which requires further processing by task 222. In other embodiments, the execution of task 212 may, in turn, trigger one or more actions to be taken by task 222. Task 222 may be notified, or be provided with the data it needs, via an interrupt message 224 through UIPI.

According to some embodiments, to utilize UIPI to send an interrupt message from the sending task 212 to the receiving task 222, routing must first be set up between the sending task 212 and the receiving task 222. To do so, in one embodiment, sending task 212 may store the relevant routing data or information into a task structure 250 associated with the sending task 212. The task structure 250, as illustrated, is stored in kernel 242 (e.g., OS kernel) of the memory 250. Task structure 250 may include any number of entries 252-0-252-N. Each of the entries represents, or corresponds to, a logical pairing between the sending task 212 and one receiving task. Each respective entry is therefore used to store the routing data for delivering the interrupt message from the sending task 212 to a corresponding receiving task. For example, as illustrated in FIG. 2, sending task 212 stores 270 into entry 252-0 routing data for routing the interrupt message to the receiving task 222. According to an embodiment, stored within entry 252-0 is a pointer to an entry 262-0 in the receiving task's task structure 260. For example, the pointer may include an address of the task structure 260 and an index into the structure. In addition to the pointer, entry 252-0 may also store any information relevant to the delivery of the UIPI to the receiving task 222. For example, entry 252-0 may include an interrupt posting descriptor identifying entry 262-0, information identifying the receiving task 222 and/or the target processing unit 220, information identifying the sending task 210 and/or the source processing unit 210, data to be processed by the receiving task/processing unit, actions to be taken by the receiving task/processing unit, etc. The routing data/information stored in entry 252-0 is usable to identify the pairing between the sending task and the receiving task, and by extension, the pairing between the source processing unit and target processing unit. In addition, the routing data may also specify the type of pairing between the source and receiving tasks/processing units.

According to an embodiment, once routing data is stored into the task structure, it is also provided to the PMU 230. The PMU 230 may detect the task structure being modified and responsively retrieves 272 the routing data from task structure 250. Alternatively, another hardware circuitry (not shown), such as routing data delivery circuitry, may perform the detection and responsively transmit 272 the routing data from task structure 250 to the PMU 230. The PMU 230 may detect, from the routing data, the pairing between tasks 212 and 212, and between the respective processing units 210, 220. The PMU 230 may also determine, from the routing data, the pairing performance boost type to be implemented between the source and target processing units. The detected pairing and the type of performance boost pairing may be stored as pairing record 234 in a local storage of the PMU 230.

Based on the pairing and the type of performance boost pairing in the pairing records 234, the PMU 230 can then adjust the performance state of the target processing unit accordingly. For example, when the paring records indicates that the pairing is for static performance boost (static pairing), the PMU 230 is to always pair the performance state between the source processing unit and the target processing unit irrespective of whether any interrupt is actually issued. Thus, in one embodiment, if the performance level of the target processing unit is different (e.g., lower) than that of the source processing unit, the PMU 230 is to adjust the performance level of the target processing unit to match the performance level of the source processing unit. In some embodiments, the adjustment is dynamic. For example, the PMU 230 may be configured to adjust the performance level of the target processing unit 220 to match that of the source processing unit 210 each time the performance level of the source processing unit 210 is changed. Moreover, in some cases, instead of adjusting the performance state of the target processing unit to match performance states of the source processing unit, a new (e.g., higher) performance state may be set for both the source and the target processing units.

To adjust the performance state of the target processing unit, the performance control unit 232 of the PMU 230 may transmit 274 a signal to the target processing unit 220. If necessary, the performance control unit 232 may also transmit a signal 275 to the source processing unit 210 to adjust its performance state.

If, instead of static pairing, the routing data indicates that the pairing is for on-demand performance boost (on-demand pairing), the PMU 230 is then to boost the performance state of the target processing unit to match that of the source processing unit only after the execution of a send interrupt instruction. For example, after the interrupt routing is set up between sending task 212 and the receiving task 222, as detailed above, processing unit 210 may execute a send interrupt instruction to dispatch the interrupt message. When such instruction is executed, some or all of the routing data in entry 252-0 may be copied or stored 276 into entry 262-0 of task structure 260. Task 222 may detect the new entry in the task structure 260 and responsively access 278 the information in entry 262-0. Then, based on the information in entry 262-0, Task 222 performs the necessary actions, such as processing the data generated by the sending task 210.

According to an embodiment, the execution of the send interrupt instruction by processing unit 210 is also detected by the PMU 230. Then, based on the detection and the pairing records 234, the PMU 230 may responsively adjust the performance level of target processing unit 220 to match the performance level of the source processing unit. For example, if the target processing unit 220 is idling or operating at a performance level that is lower than the performance level at which the source processing unit 210 is operating, PMU 230 may send a signal 274 to increase the performance level of the target processing unit 220. Therefore, as the sending task 212 dispatches work to be performed by receiving task 222, processing units 210 and 220 would already be operating at a matching performance state and thereby minimizes latency.

Figure 3:
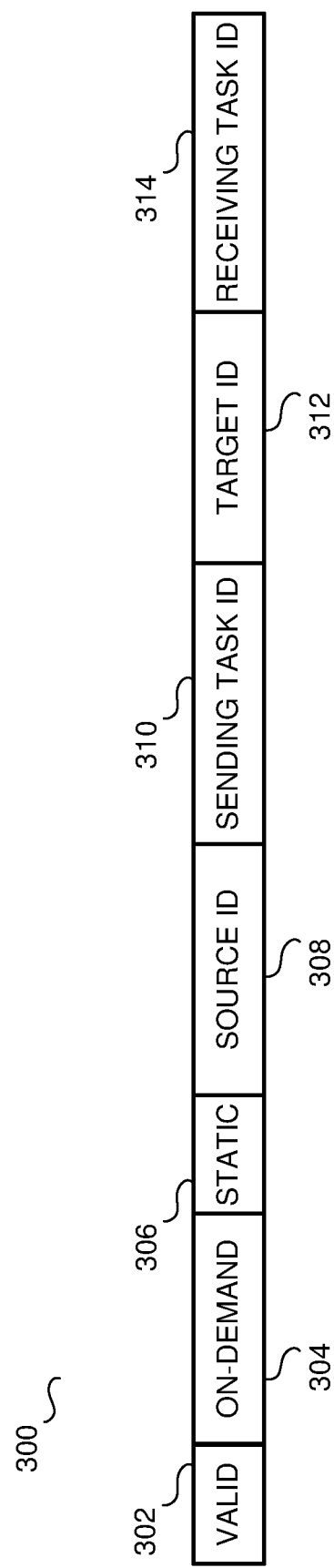
FIG. 3 illustrates an exemplary entry of the task structure according to an embodiment.

FIG. 3 illustrates an exemplary entry of a task structure according to an embodiment. The entry may be referred to as the user interrupt target entry. While the entry 300 is shown to include certain fields, it should be appreciated that more or less fields may be included, as well as those not shown in FIG. 3. Each of the fields may comprise one or more bits. A validity field 302 indicates whether the contents of the entry is valid. An on-demand pairing performance boost field 304 indicates whether the performance state shall be boosted for both the source and target processing unit at the point of execution of the send interrupt instruction. A static pairing performance boost field 306 indicates whether the performance state should always be paired between the source and the target processing unit. A set static pairing performance boost field ensures that the source and the target processing unit are always in the same performance level, even without the execution of the send interrupt instruction. In some embodiments, the static pairing performance boost field 306, when set, overrides the on-demand pairing performance boost field 304. Thus, if both fields 304 and 306 are set, static performance boost will be implemented in which the performance management unit will ensure that the performance level of the source and target processing units always match.

A source identification field 308 stores information identifying the source processing unit on which the sending task is executed. A sending task identification field 310 stores information identifying the sending task. A target identification field 312 stores information identifying the target processing unit on which the receiving task is executed. A receiving task identification field 310 stores information identifying the receiving task.

Figure 4:
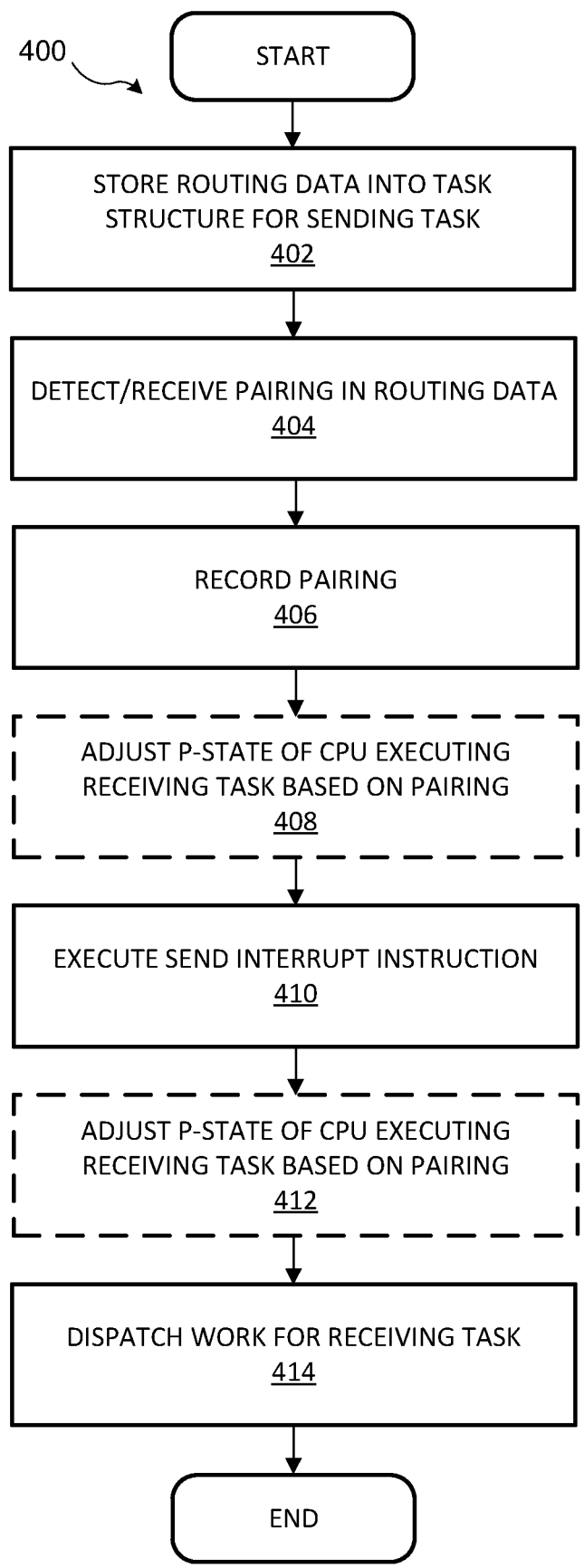
FIG. 4 is a flow diagram illustrating a method embodiment for performance state matching between source and target processors based on user inter-processor interrupt routing information.

FIG. 4 is a flow diagram illustrating a method embodiment for performance state matching between source and target processing units based on user inter-process interrupt routing information. Method 400 may be implemented in any of the system embodiments described herein as well as other suitable systems. Method 400 begins at the start block. At block 202, routing data indicating a pairing between a sending task and a receiving task is stored into a task structure, such as the task structure 250 of FIG. 2. This may be performed, or initiated, by the task (e.g., 112, 212) and/or the processing unit (e.g., 110, 210). The pairing data may identify the source and target processing units on which the respective sending and receiving tasks are executed. The task structure may be stored in the system memory, such as in the OS kernel space of the system memory. At block 404, the routing data stored into the task structure is detected by a performance management unit, such as PMU 230 of FIG. 2. Alternatively, or in addition to, the routing data, or the pairing information derived from the routing data, may be transmitted to the performance management unit by hardware circuitry and/or microcode. At block 406, the routing data or the pairing information is stored locally as pairing records by the performance management unit. At block 408, the performance state of the target processing unit executing the receiving task is adjusted by the performance management unit to match the performance state of the source processing unit executing the sending task. As detailed further below, this adjustment is optional, as indicated by the dotted box. Specifically, this adjustment is performed only if the pairing, as indicated by the pairing record, is for static performance boost. At block 410, a send interrupt instruction is executed. The send interrupt instruction may be executed by the source processing unit (e.g., 110, 210), responsive to, or as part of the execution of the sending task (e.g., 112, 212). At block 412, the performance state of the target processing unit executing the receiving task is be adjusted by the performance management unit to match the performance state of the source processing unit executing the sending task. Again, block 412 is optional, as indicated by the dotted line border. The adjustment of the performance state of the target processing unit takes place only if the pairing record indicates that the pairing is for on-demand performance boost. At block 414, responsive to the execution of the send interrupt message by the source processing unit (e.g., 110, 210), the interrupt message is transmitted or provided to the receiving task. In some embodiments, work may be dispatched to the target processing unit to be processed by the receiving task.

Figure 5:
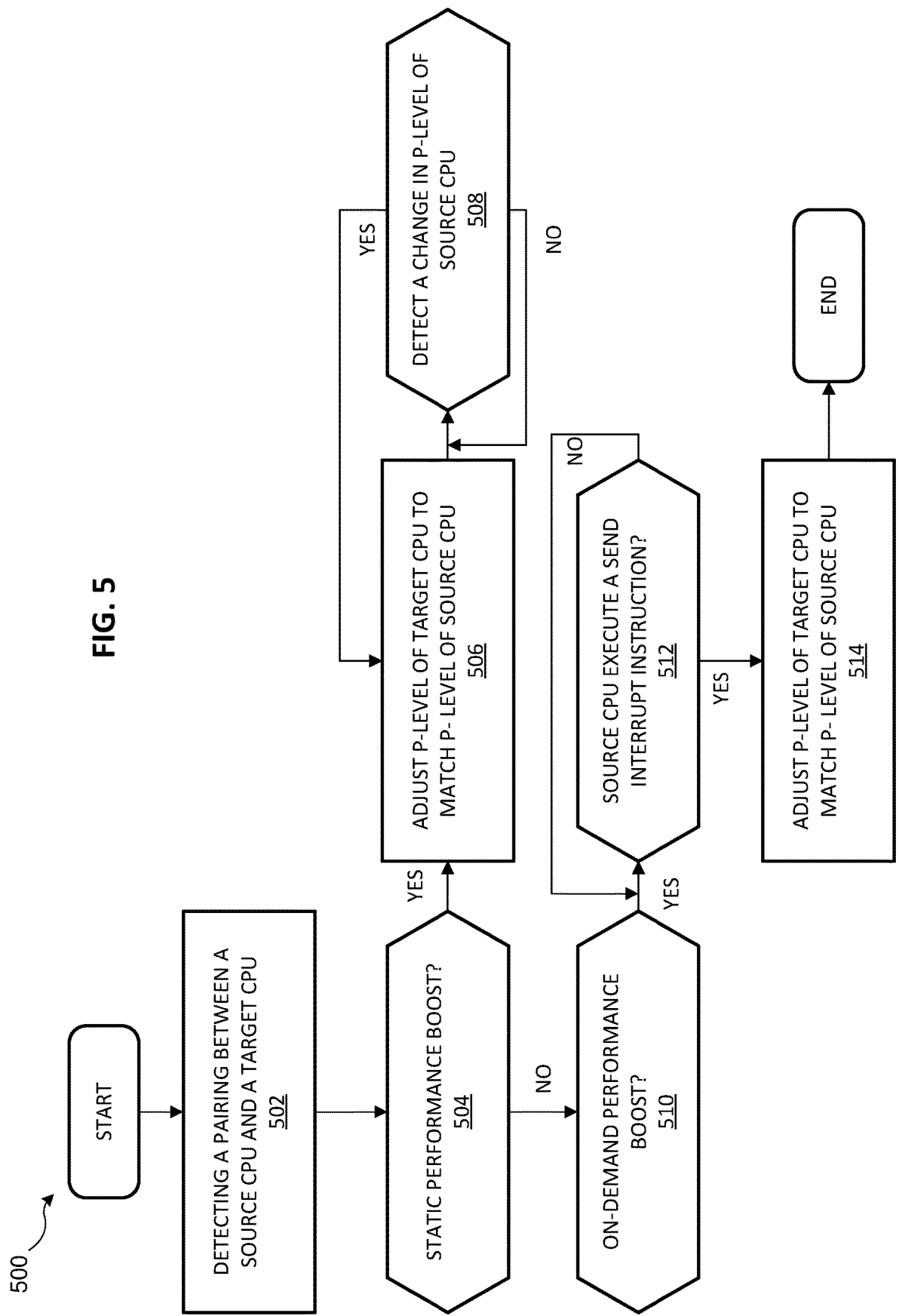
FIG. 5 is a flow diagram illustrating a method for adjusting the performance state of a target processor according to an embodiment.

FIG. 5 is a flow diagram illustrating a method for adjusting the performance state of a target processing unit according to an embodiment. Method 500 may be implemented in any of the systems described herein as well as other systems. Specifically, the operations of method 500 may be performed by a performance management unit, such as the PMU 230 of FIG. 2. Method 500 begins at the starting block. At block 502, a pairing between source and target processing units is detected. The pairing may be detected based on routing data or pairing information stored in the pairing records of the PMU. Alternatively, or in addition to, the pairing may be detected based on the routing data stored in a task structure. The routing data may indicate that a sending task executing on the source processing unit is to send an interrupt message to a receiving task executing on the target processing unit. At block 504, a determination is made on whether the pairing for static performance boost. This may be determined by on checking whether a static pairing performance boost field is set in the pairing records or the routing data. If so, at block 506, the performance level (p-level) of the target processing unit is adjusted to match the performance level of the source processing unit. A signal may be sent to the target processing unit to set its operating frequency or clock cycle to that of the source processing unit. Alternatively, the power supplied to the target processing unit may be increased to the same level as the source processing unit. According to an embodiment, for static pairing, the performance level of the source processing unit is continuously monitored or periodically checked for change. If, at block 508, it is determined that the performance level of the source processing unit has changed, or is about to change, to a new performance level, then the performance level of the target processing unit is adjusted accordingly, at block 506, to match the new performance level of the source processing unit.

Returning to block 504, if it is determined in block 504 that the pairing is not for static performance boost, then at block 510, a determination is made on whether the pairing is for on-demand performance boost. This determination may be made by checking whether on an on-demand pairing performance boost field is set in the pairing record or the routing data. If the pairing is for on-demand performance boost, then at block 512, a determination is made on whether the source processing unit has executed a send interrupt instruction, the execution of which is to cause an interrupt message to be transmitted to the target processing unit. If the send interrupt instruction has indeed been executed, then at block 514, the performance level of the target processing unit is adjusted to match the performance level of the source processing unit. If the send interrupt instruction has not yet been executed, the source processing unit is monitored for the execution of the send interrupt instruction.

An example of the present invention is an apparatus that includes a target processor to execute a receiving task, a source processor to execute a sending task, a memory to store instructions and data, and a performance management circuitry or unit to control the performance levels of the target and/or source processors. The target processor may operate at a current performance level equal to a first performance level and the source processor may operate at a second performance level that is higher than the first performance level. A first memory location is provided by the memory to store interrupt routing data, which may indicate, or from which an indication may be determined, that a pairing exists between the sending task and the receiving task. The sending task may dispatch work to be processed by the receiving task responsive to an execution of a send interrupt instruction by the source processor. The performance management circuitry may detect the pairing between the sending task and the receiving task based on the interrupt routing data stored in the first memory location and responsively adjust the current performance level of the target processor from the first performance level to the second performance level based, at least in part, on the pairing. If the interrupt routing data indicates that the pairing is an on-demand pairing, the performance management circuitry may adjust the current performance level of the target processor responsive to the execution of the send interrupt instruction by the source processor. On the other hand, if the interrupt routing data indicates the pairing is a static pairing, the performance management circuitry may adjust the current performance level of the target processor based simply on the detection of the pairing by the performance management circuitry. This adjustment may occur prior to, or in the absence of, the execution of the send interrupt instruction by the source processor. Moreover, if the interrupt routing data indicates the pairing is a static pairing, the performance management circuitry may adjust the current performance level of the target processor to match a current performance level of the source processor each time the current performance level of the source processor is changed. A hardware circuitry (e.g., routing data delivery circuitry) may provide at least part of the interrupt routing data from the first memory location to the performance management circuitry. The provided interrupt routing data may be usable by the performance management circuitry to detect the pairing between the sending task and the receiving task. The performance management circuitry may include a local storage to store the detected pairing between the sending task and the receiving task. The interrupt routing data may be used to identify the target processor and the work to be processed by the receiving task. In response to the execution of the send interrupt instruction by the source processor, at least some of the interrupt routing data from the first memory location may be stored into a second memory location monitored by the target processor. The first memory location and/or the second memory location may be located in a kernel memory of an operating system (OS). The performance management circuitry may adjust the current performance level of the target processor by regulating power supplied to the target processor and/or by setting an operating frequency of the target processor.

Another example of the present invention is a method that includes: operating a target processor at a current performance level equal to a first performance level; operating a source processor at a second performance level higher than the first performance level; executing a receiving task on the target processor; executing a sending task on the source processor; storing, into a first memory location of a memory, interrupt routing data indicating a pairing between the sending task and the receiving task, wherein the sending task is to dispatch work to be processed by the receiving task responsive to an execution of a send interrupt instruction by the source processor; detecting, by performance management circuitry, the pairing between the sending task and the receiving task based on the interrupt routing data stored in the first memory location; and adjusting, by the performance management circuitry, the current performance level of the target processor from the first performance level to the second performance level based, at least in part, on the pairing. The method may also include adjusting, by the performance management circuity, the current performance level of the target processor responsive to the execution of the send interrupt instruction by the source processor, if the interrupt routing data indicates that the pairing is on-demand pairing. However, if the interrupt routing data indicates that the pairing is static pairing, the method may instead include adjusting, by the performance management circuity, the current performance level of the target processor responsive to detection of the pairing by the performance management circuitry. This adjustment may occur prior to, or in the absence of, the execution of the send interrupt instruction by the source processor. Moreover, in the case that the pairing is a static pairing, the method may further include adjusting, by the performance management circuity, the current performance level of the target processor to match a current performance level of the source processor each time the current performance level of the source processor is changed. In some cases, the method may include providing at least part of the interrupt routing data from the first memory location to the performance management circuitry, the provided interrupt routing data may be usable by the performance management circuitry to detect the pairing between the sending task and the receiving task. The detected pairing between the sending task and the receiving task may be stored into a local storage of the performance management circuitry. The interrupt routing data may indicate the target processor and the work to be processed by the receiving task. The method may also include storing at least some of the interrupt routing data from the first memory location into a second memory location monitored by the target processor responsive to the execution of the send interrupt instruction by the source processor. The first memory location and/or the second memory location may be located in a kernel memory for an operating system (OS). The method may include adjusting, by the performance management circuitry, the current performance level of the target processor by regulating power supplied to the target processor and/or setting an operating frequency of the target processor.

An additional example of the present invention is a system that includes a plurality of processors, a system memory shared by the plurality of processors to store instructions and data, a performance management unit to control the performance level of one or more of the plurality of processors, and routing data delivery circuitry to provide interrupt routing data to the performance management unit. The plurality of processors may include a target processor to execute a receiving task and a source processor to execute a sending task. The target processor may operate at a current performance level equal to a first performance level and the source processor may operate at a second performance level that is higher than the first performance level. A first memory location is provided by the system memory to store interrupt routing data, which may indicate, or from which an indication may be determined, that a pairing exists between the sending task and the receiving task. The sending task may dispatch work to be processed by the receiving task responsive to an execution of a send interrupt instruction by the source processor. The performance management circuitry may detect the pairing between the sending task and the receiving task based on the interrupt routing data, or parts thereof, received from the routing data delivery circuitry. The performance manage unit may responsively adjust the current performance level of the target processor from the first performance level to the second performance level based, at least in part, on the pairing. If the interrupt routing data indicates that the pairing is an on-demand pairing, the performance management circuitry may adjust the current performance level of the target processor responsive to the execution of the send interrupt instruction by the source processor. On the other hand, if the interrupt routing data indicates the pairing is a static pairing, the performance management circuitry may adjust the current performance level of the target processor based simply on the detection of the pairing by the performance management circuitry. This adjustment may occur prior to, or in the absence of, the execution of the send interrupt instruction by the source processor. Moreover, if the interrupt routing data indicates the pairing is a static pairing, the performance management circuitry may adjust the current performance level of the target processor to match a current performance level of the source processor each time the current performance level of the source processor is changed. A hardware circuitry (e.g., routing data delivery circuitry) may provide at least part of the interrupt routing data from the first memory location to the performance management circuitry. The provided interrupt routing data may be usable by the performance management circuitry to detect the pairing between the sending task and the receiving task. The performance management circuitry may include a local storage to store the detected pairing between the sending task and the receiving task. The interrupt routing data may be used to identify the target processor and the work to be processed by the receiving task. In response to the execution of the send interrupt instruction by the source processor, at least some of the interrupt routing data from the first memory location may be stored into a second memory location monitored by the target processor. The first memory location and/or the second memory location may be located in a kernel memory of an operating system (OS). The performance management circuitry may adjust the current performance level of the target processor by regulating power supplied to the target processor and/or by setting an operating frequency of the target processor.

Figure 6:
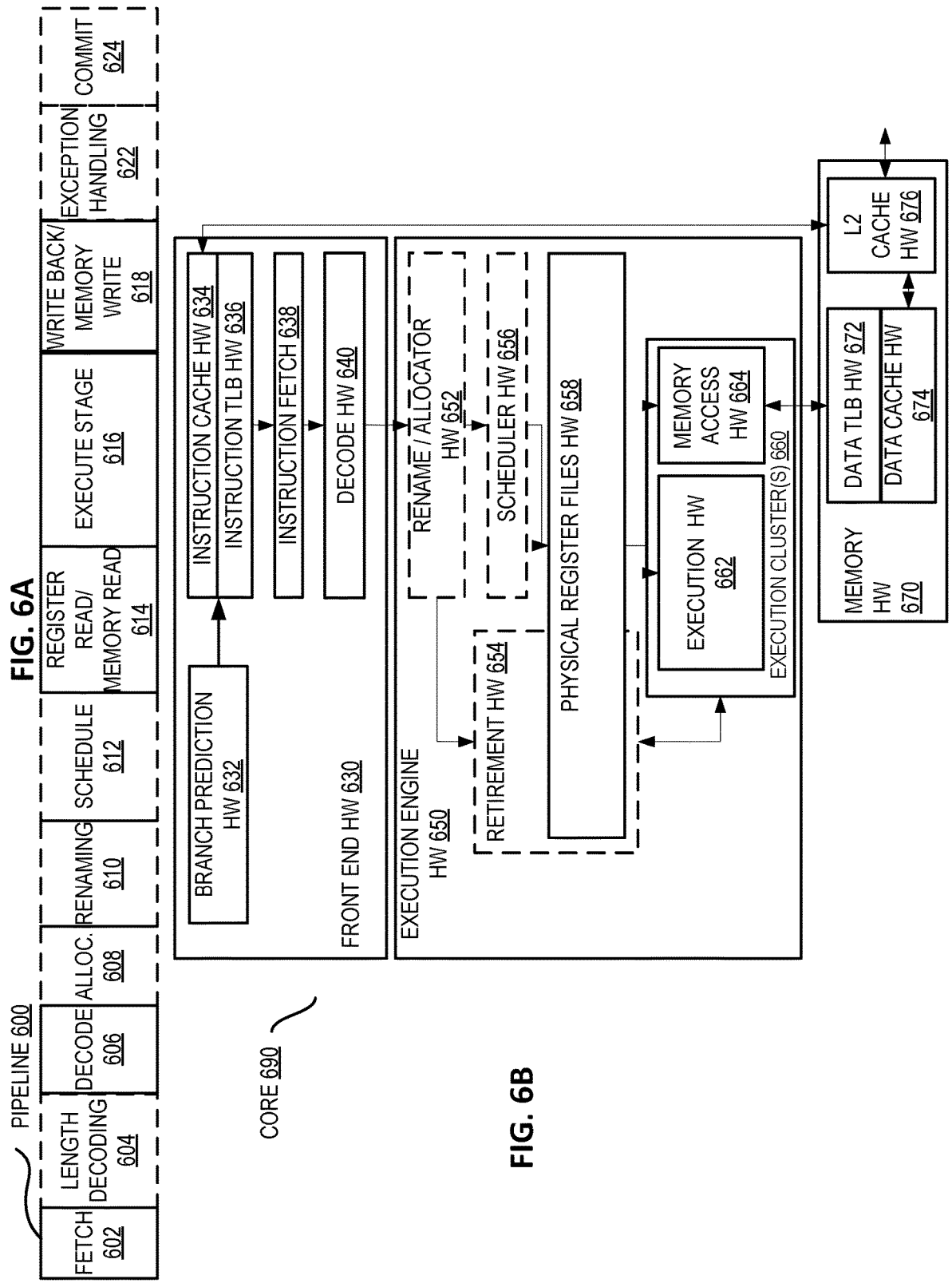
FIG. 6A is a block diagram illustrating both an exemplary in-order pipeline and an exemplary register renaming, out-of-order issue/execution pipeline according to embodiments of the invention.
FIG. 6B is a block diagram illustrating both an exemplary embodiment of an in-order architecture core and an exemplary register renaming, out-of-order issue/execution architecture core to be included in a processor according to embodiments of the invention.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end hardware 630 coupled to an execution engine hardware 650, and both are coupled to a memory hardware 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end hardware 630 includes a branch prediction hardware 632 coupled to an instruction cache hardware 634, which is coupled to an instruction translation lookaside buffer (TLB) 636, which is coupled to an instruction fetch hardware 638, which is coupled to a decode hardware 640. The decode hardware 640 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode hardware 640 or otherwise within the front end hardware 630). The decode hardware 640 is coupled to a rename/allocator hardware 652 in the execution engine hardware 650.

The execution engine hardware 650 includes the rename/allocator hardware 652 coupled to a retirement hardware 654 and a set of one or more scheduler hardware 656. The scheduler hardware 656 represents any number of different schedulers, including reservations stations, central instruction window, etc. The scheduler hardware 656 is coupled to the physical register file(s) hardware 658. Each of the physical register file(s) hardware 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 658 comprises a vector registers hardware, a write mask registers hardware, and a scalar registers hardware. This register hardware may provide architectural vector registers, vector mask registers, and general purpose registers. The physical register file(s) hardware 658 is overlapped by the retirement hardware 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 654 and the physical register file(s) hardware 658 are coupled to the execution cluster(s) 660. The execution cluster(s) 660 includes a set of one or more execution hardware 662 and a set of one or more memory access hardware 664. The execution hardware 662 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 656, physical register file(s) hardware 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 664). It should also be understood that where separate pipelines are used, one or more of these pipelines may be out-of-order issue/execution and the rest in-order.

The set of memory access hardware 664 is coupled to the memory hardware 670, which includes a data TLB hardware 672 coupled to a data cache hardware 674 coupled to a level 2 (L2) cache hardware 676. In one exemplary embodiment, the memory access hardware 664 may include a load hardware, a store address hardware, and a store data hardware, each of which is coupled to the data TLB hardware 672 in the memory hardware 670. The instruction cache hardware 634 is further coupled to a level 2 (L2) cache hardware 676 in the memory hardware 670. The L2 cache hardware 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode hardware 640 performs the decode stage 606; 3) the rename/allocator hardware 652 performs the allocation stage 608 and renaming stage 610; 4) the scheduler hardware 656 performs the schedule stage 612; 5) the physical register file(s) hardware 658 and the memory hardware 670 perform the register read/memory read stage 614; the execution cluster 660 perform the execute stage 616; 6) the memory hardware 670 and the physical register file(s) hardware 658 perform the write back/memory write stage 618; 7) various hardware may be involved in the exception handling stage 622; and 8) the retirement hardware 654 and the physical register file(s) hardware 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 634/674 and a shared L2 cache hardware 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
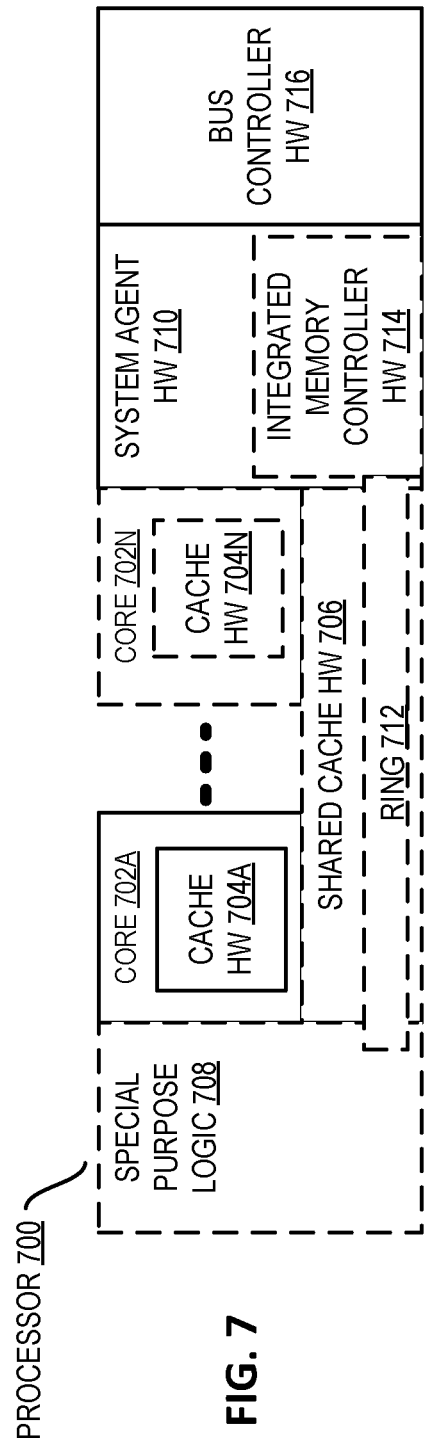
FIG. 7 is a block diagram of a single core processor and a multicore processor with integrated memory controller and graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller hardware 716, while the optional addition of the dashed lined boxes illustrates an alternative processor 700 with multiple cores 702A-N, a set of one or more integrated memory controller hardware 714 in the system agent hardware 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 706, and external memory (not shown) coupled to the set of integrated memory controller hardware 714. The set of shared cache hardware 706 may include one or more mid-level caches, such as level 2 (L2), level 3 (L3), level 4 (L4), or other levels of cache, a last level cache (LLC), and/or combinations thereof. While in one embodiment a ring based interconnect hardware 712 interconnects the integrated graphics logic 708, the set of shared cache hardware 706, and the system agent hardware 710/integrated memory controller hardware 714, alternative embodiments may use any number of well-known techniques for interconnecting such hardware. In one embodiment, coherency is maintained between one or more cache hardware 706 and cores 702-A-N.

In some embodiments, one or more of the cores 702A-N are capable of multithreading. The system agent 710 includes those components coordinating and operating cores 702A-N. The system agent hardware 710 may include for example a power control unit (PCU) and a display hardware. The PCU may be or include logic and components needed for regulating the power state of the cores 702A-N and the integrated graphics logic 708. The display hardware is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set. In one embodiment, the cores 702A-N are heterogeneous and include both the "small" cores and "big" cores described below.

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
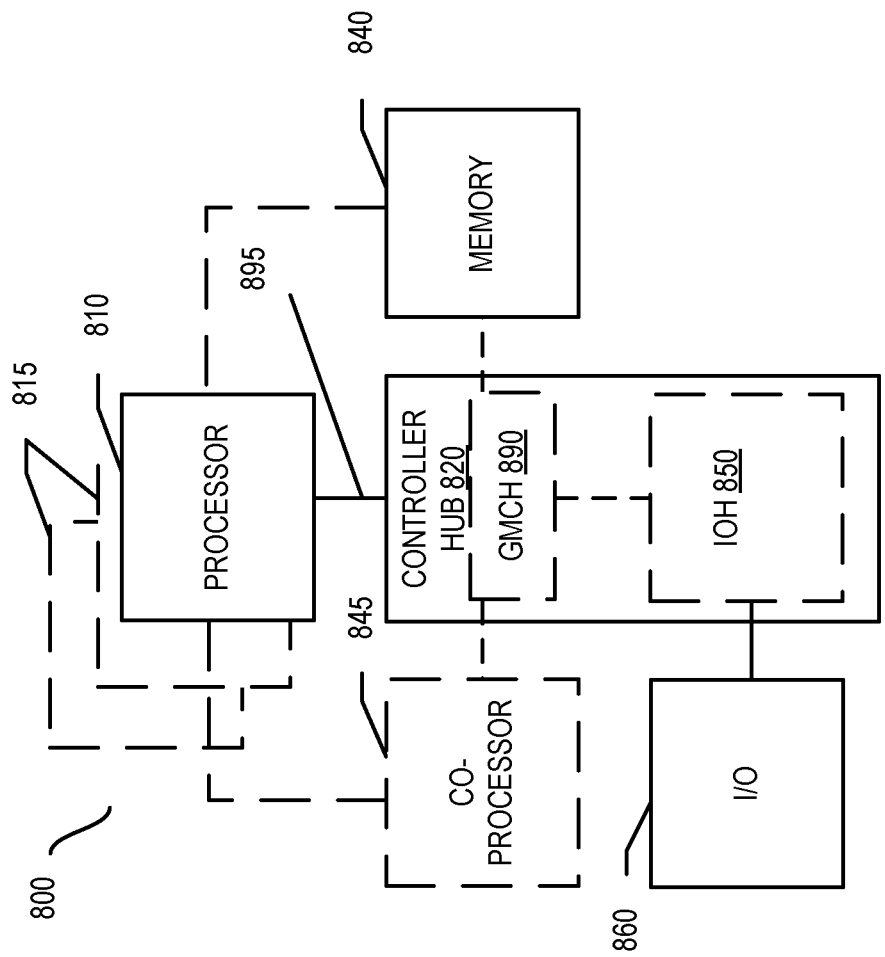
FIG. 8 illustrates a block diagram of a system in accordance with one embodiment of the present invention.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface, or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
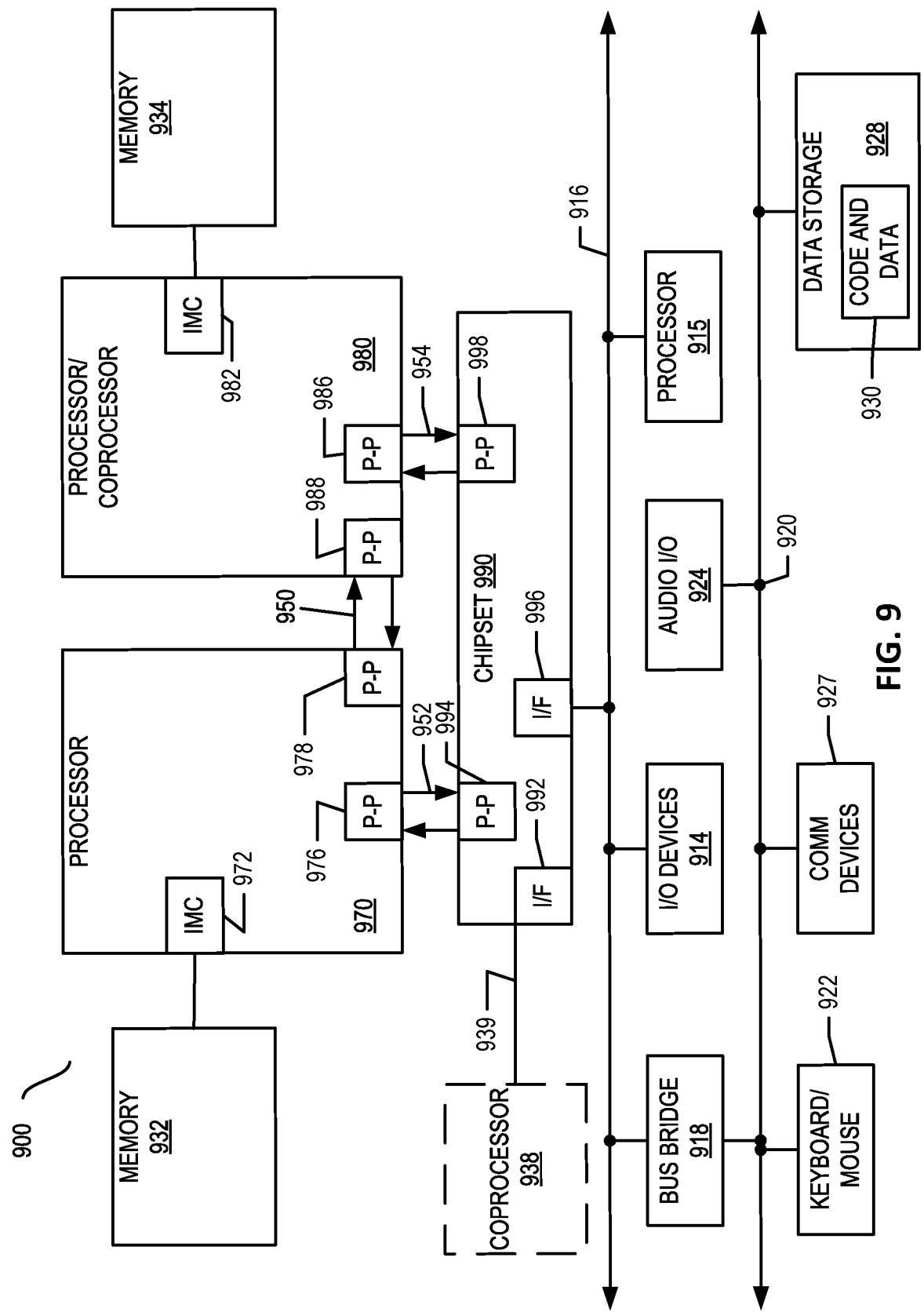
FIG. 9 illustrates a block diagram of a second system in accordance with an embodiment of the present invention.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) hardware 972 and 982, respectively. Processor 970 also includes as part of its bus controller hardware point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) hardware), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage hardware 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
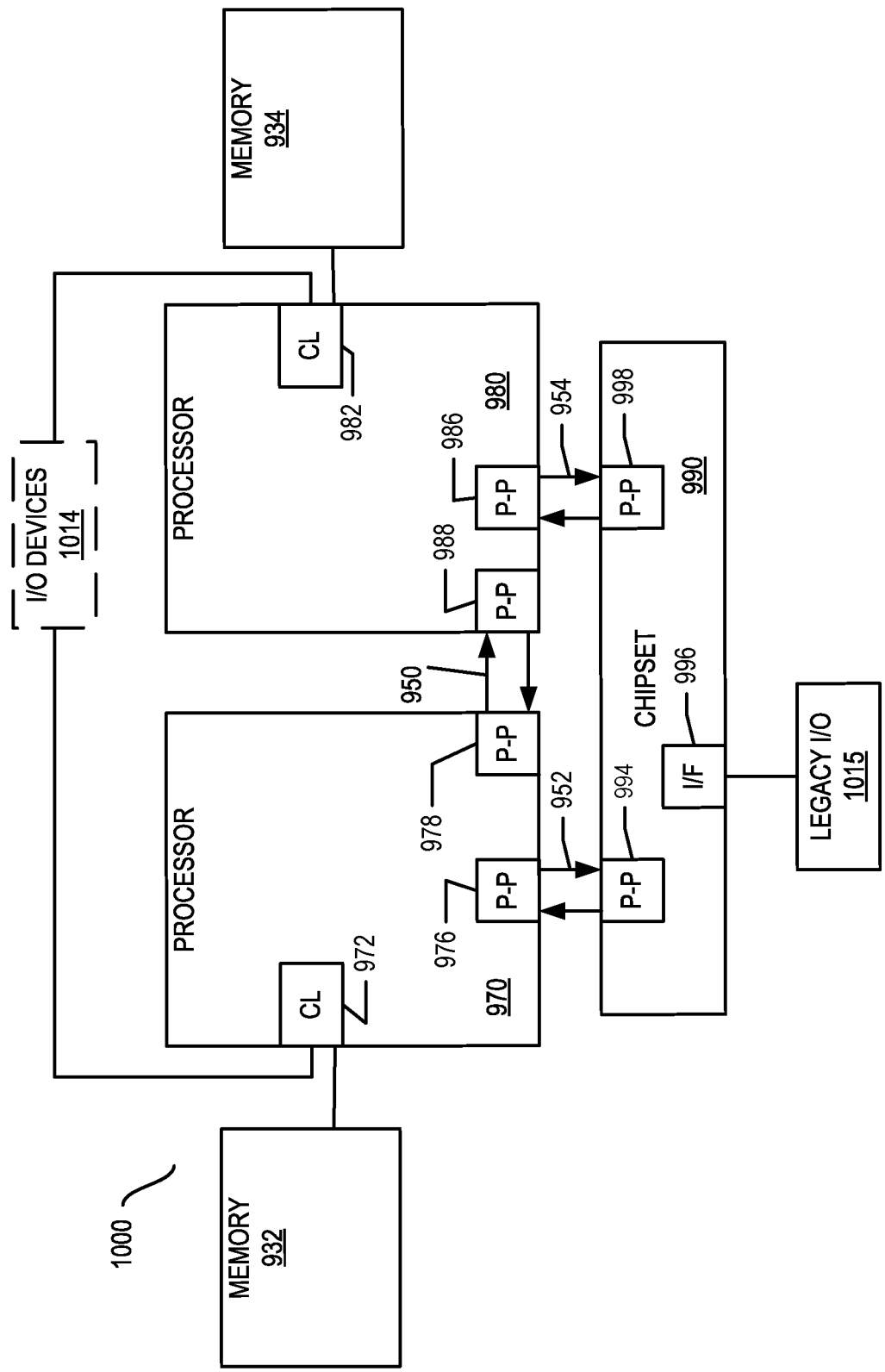
FIG. 10 illustrates a block diagram of a third system in accordance with an embodiment of the present invention.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller hardware and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
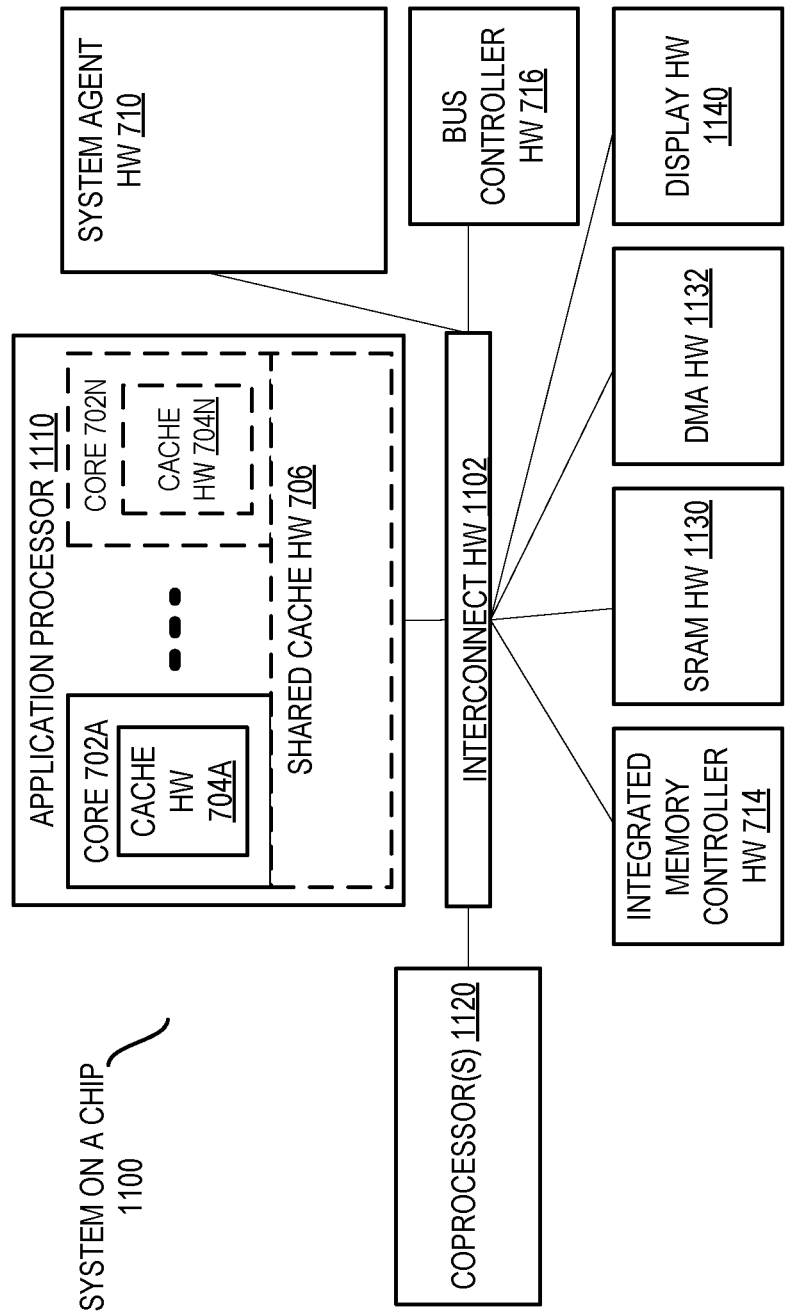
FIG. 11 illustrates a block diagram of a system on a chip (SoC) in accordance with an embodiment of the present invention.

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect hardware 1102 is coupled to: an application processor 1110 which includes a set of one or more cores 702A-N and shared cache hardware 706; a system agent hardware 710; a bus controller hardware 716; an integrated memory controller hardware 714; a set or one or more coprocessors 1120 which may include integrated graphics logic, an image processor, an audio processor, and a video processor; an static random access memory (SRAM) hardware 1130; a direct memory access (DMA) hardware 1132; and a display hardware 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
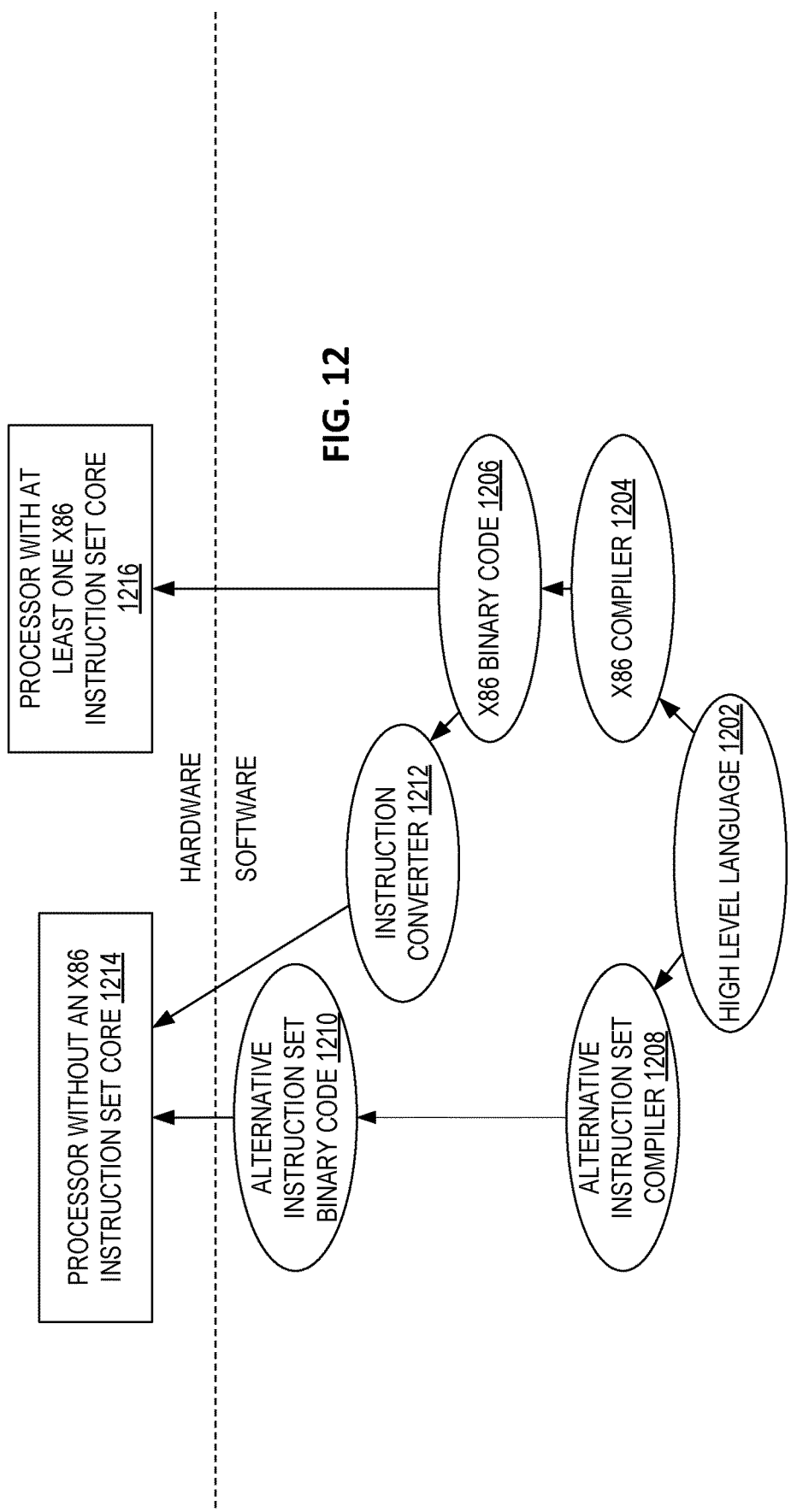
FIG. 12 illustrates a block diagram contrasting the use of a software instruction converter to convert binary instructions in a source instruction set to binary instructions in a target instruction set according to embodiments of the invention.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
a target processor to execute a receiving task, the target processor to operate at a current performance level equal to a first performance level;
a source processor to execute a sending task, the source processor to operate at a second performance level higher than the first performance level;
a memory including a first memory location to store interrupt routing data indicating a pairing between the sending task and the receiving task, wherein the sending task is to dispatch work for processing by the receiving task responsive to an execution of a send interrupt instruction by the source processor; and
performance management circuitry to detect the pairing between the sending task and the receiving task based on the interrupt routing data stored at the first memory location and to adjust the current performance level of the target processor from the first performance level to the second performance level based, at least in part, on the pairing,
wherein when the pairing indicates an on-demand pairing, the performance management circuitry is to adjust the current performance level of the target processor responsive to the execution of the send interrupt instruction, and when the pairing indicates a static pairing, the performance management circuitry is to adjust the current performance level of the target processor prior to, or without, the execution of the send interrupt instruction, and to adjust the current performance level of the target processor to match a current performance level of the source processor each time the current performance level of the source processor is changed.

2. The apparatus of claim 1, further comprising routing data delivery circuitry to provide at least part of the interrupt routing data from the first memory location to the performance management circuitry, the at least part of the interrupt routing data usable by the performance management circuitry to detect the pairing between the sending task and the receiving task.

3. The apparatus of claim 2, wherein the performance management circuitry comprises a local storage to store the detected pairing between the sending task and the receiving task.

4. The apparatus of claim 1, wherein the interrupt routing data is to identify the target processor and the work to be processed by the receiving task.

5. The apparatus of claim 1, wherein responsive to the execution of the send interrupt instruction by the source processor, at least some of the interrupt routing data from the first memory location is to be stored into a second memory location monitored by the target processor.

6. The apparatus of claim 5, wherein the first memory location and/or the second memory location are associated with a kernel memory of an operating system (OS).

7. The apparatus of claim 1, wherein the performance management circuitry is to adjust the current performance level of the target processor by regulating power supplied to the target processor and/or setting an operating frequency of the target processor.

8. A method comprising:
operating a target processor at a current performance level equal to a first performance level;
operating a source processor at a second performance level higher than the first performance level;
executing a receiving task on the target processor;
executing a sending task on the source processor;
storing, at a first memory location of a memory, interrupt routing data indicating a pairing between the sending task and the receiving task, wherein the sending task is to dispatch work for processing by the receiving task responsive to an execution of a send interrupt instruction by the source processor;
detecting, by performance management circuitry, the pairing between the sending task and the receiving task based on the interrupt routing data stored at the first memory location; and
adjusting, by the performance management circuitry, the current performance level of the target processor from the first performance level to the second performance level based, at least in part, on the pairing,
wherein when the pairing indicates an on-demand pairing, the adjusting comprises adjusting the current performance level of the target processor responsive to the execution of the send interrupt instruction, and when the pairing indicates a static pairing, the adjusting comprises adjusting the current performance level of the target processor prior to, or without, the execution of the send interrupt instruction, and adjusting the current performance level of the target processor to match a current performance level of the source processor each time the current performance level of the source processor is changed.

9. The method of claim 8, further comprising:
providing at least part of the interrupt routing data from the first memory location to the performance management circuitry, the at least part of the interrupt routing data usable by the performance management circuitry to detect the pairing between the sending task and the receiving task.

10. The method of claim 9, further comprising:
storing the detected pairing between the sending task and the receiving task in a local storage of the performance management circuitry.

11. The method of claim 8, wherein the interrupt routing data is to indicate the target processor and the work to be processed by the receiving task.

12. The method of claim 8, further comprising:
storing at least some of the interrupt routing data from the first memory location into a second memory location monitored by the target processor responsive to the execution of the send interrupt instruction by the source processor.

13. The method of claim 12, wherein the first memory location and/or the second memory location are located in a kernel memory for an operating system (OS).

14. The method of claim 8, further comprising:
adjusting, by the performance management circuitry, the current performance level of the target processor by regulating power supplied to the target processor and/or setting an operating frequency of the target processor.

15. A system comprising:
a plurality of processors including:
a target processor to execute a receiving task, the target processor to operate at a current performance level equal to a first performance level;
a source processor to execute a sending task, the source processor to operate at a second performance level higher than the first performance level;
a system memory shared by the plurality of processors to store instructions and data, the system memory including a first memory location to store interrupt routing data indicating a pairing between the sending task and the receiving task, wherein the sending task is to dispatch work for processing by the receiving task responsive to an execution of a send interrupt instruction by the source processor;
performance management circuitry to adjust a performance level of one or more of the plurality of processors; and
routing data delivery circuitry to detect the interrupt routing data stored at the first memory location and to provide the interrupt routing data to the performance management circuitry;
wherein the performance management circuitry is to detect the pairing between the sending task and the receiving task based on the interrupt routing data and to adjust the current performance level of the target processor from the first performance level to the second performance level based, at least in part, on the pairing,
wherein when the pairing indicates an on-demand pairing, the performance management circuitry is to adjust the current performance level of the target processor responsive to the execution of the send interrupt instruction, and when the pairing indicates a static pairing, the performance management circuitry is to adjust the current performance level of the target processor prior to, or without, the execution of the send interrupt instruction, and to adjust the current performance level of the target processor to match a current performance level of the source processor each time the current performance level of the source processor is changed.

16. The system of claim 15, wherein the performance management circuitry comprises a local storage to store the detected pairing between the sending task and the receiving task.

17. The system of claim 15, wherein the interrupt routing data is to identify the target processor and the work to be processed by the receiving task.

18. The system of claim 15, wherein responsive to the execution of the send interrupt instruction by the source processor, at least some of the interrupt routing data from the first memory location is to be stored into a second memory location monitored by the target processor.

19. The system of claim 18, wherein the first memory location and/or the second memory location are associated with a kernel memory of an operating system (OS).

20. The system of claim 15, wherein the performance management circuitry is to adjust the current performance level of the target processor by regulating power supplied to the target processor and/or setting an operating frequency of the target processor.

* * * * *